April 30, 1968   V. G. HANSEN   3,381,292
RADAR DETECTION SYSTEM
Filed May 1, 1967   3 Sheets-Sheet 1

Vilhelm G. Hansen,
INVENTOR.

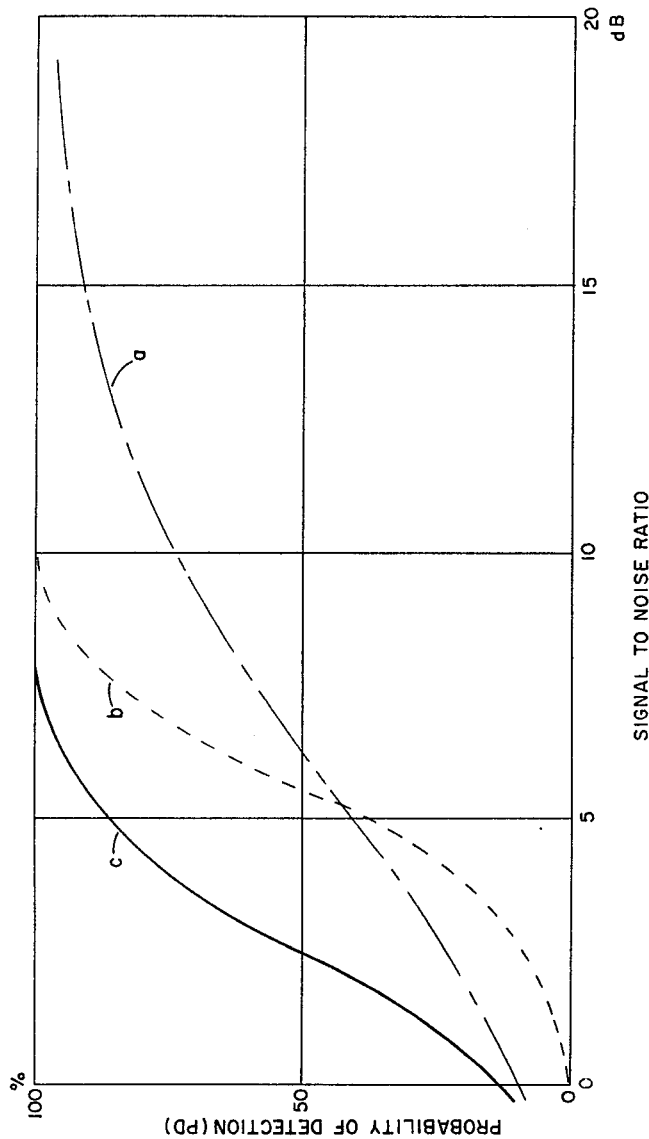

United States Patent Office 3,381,292
Patented Apr. 30, 1968

3,381,292
RADAR DETECTION SYSTEM
Vilhelm G. Hansen, Hillerod, Denmark, assignor to the United States of America as represented by the Secretary of the Army
Filed May 1, 1967, Ser. No. 635,968
2 Claims. (Cl. 343—17.5)

ABSTRACT OF THE DISCLOSURE

A system for increasing the detection range of frequency agile radars. A logical circuit and a frequency control circuit is provided in the system for controlling the transmitter frequency in accordance with the amplitude level of the radar return signals.

Background of the invention

Certain radar systems exist in which the frequency of the transmitted radar signal in some arbitrary manner can be chosen within a relatively broad frequency band. These radar systems are often referred to as frequency agile radars ("springradar" or "variable radar").

A specific example of such a system is shown in a Dutch patent application No. 247,239 laid open to public inspection on Feb. 10, 1964.

Summary of the invention

This invention provides for an increase of the detection range of systems of the above-mentioned type. This increase is obtained through the use of a logical circuit which controls the transmitter in the following manner. Whenever in a specified observation period (and if applicable also within a certain range interval) the signal received exceeds a certain threshold, then the same transmission frequency as was used in that observation period is used again for at least one following observation period. At this time frequency agile operation is resumed.

The invention makes use of the known fact that the equivalent echoing area (radar cross section) of a complex radar target is some random function of observation time and radar frequency. Vide the book by M. I. Skolnik, "Introduction to Radar Systems." McGraw-Hill, New York, 1962, page 43. Normally, the fluctuations with time are sufficiently slow, so that the target echoing area is essentially constant during the illumination time of the radar, but is fluctuating randomly from scan to scan (this is usually referred to as "slow fading").

A change in the radar frequency, on the other hand, results in an instantaneous change in the target echoing area, so that random changes in frequency from impulse to impulse result in random fluctuations in the target echoing area (usually referred to as "fast fading").

The present invention establishes the means to determine, through the observation of these noise-like radar returns, a frequency which gives a larger than average target echoing area, so that the subsequent use of this frequency (during the same illumination time) increases the average signal-to-noise ratio in the radar receiver and thereby increases the detection range.

Brief description of the drawing

FIGURE 5 shows, in graphical form, the improvement in detection performance that may be expected from use of the invention.

Description of the preferred embodiment

Figure 1:
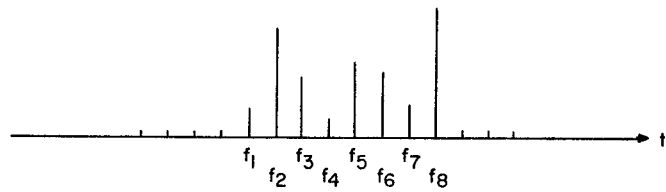
FIGURE 1 shows the echo amplitudes received from a target during the illumination time of the radar for the case of "fast fading."

In FIGURE 1, the echo amplitudes received from a complex target are shown as vertical lines for the case of a frequency agile radar. The notation $f_1, f_2 \ldots f_8$ along the time axis indicates different radar transmission frequencies. This figure shows the frequency dependence of the echo amplitude and it is seen that, in particular, the frequencies $f_2$ and $f_8$ result in large amplitudes.

Figure 2:
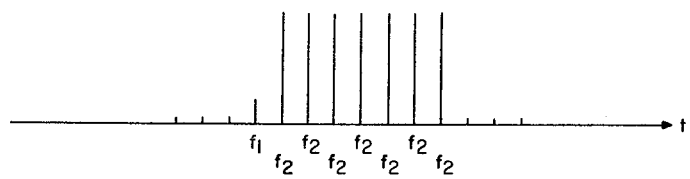
FIGURE 2 shows the echo amplitudes received from the target during the illumination time of the radar where, after reception of the second echo, the corresponding frequency is used for the remainder of the illumination time.

In FIGURE 2, it can now be seen how the total energy of the pulse train received can be significantly increased, if it can be arranged that a frequency which results in a large echo amplitude (e.g., $f_2$ in FIGURE 2) is used for the remainder of the illumination time. This might, for example, be implemented in such a way that any echo, the amplitude of which exceeds a certain threshold V, would cause the same frequency to be used in subsequent transmissions.

In practice, the situation is complicated by the presence of internal receiver noise, which superimposed itself on to the received echo signals.

It is then possible that a signal amplitude exceeding the threshold V is not due to a target but is caused by receiver noise only. That this has occurred will become evident, when upon subsequent transmissions on the same frequency only noise is observed, which for a reasonably high threshold level is unlikely to exceed this threshold again. In this case, it is desirable to return as quickly as possible to the frequency agile mode of operation.

Figure 3:
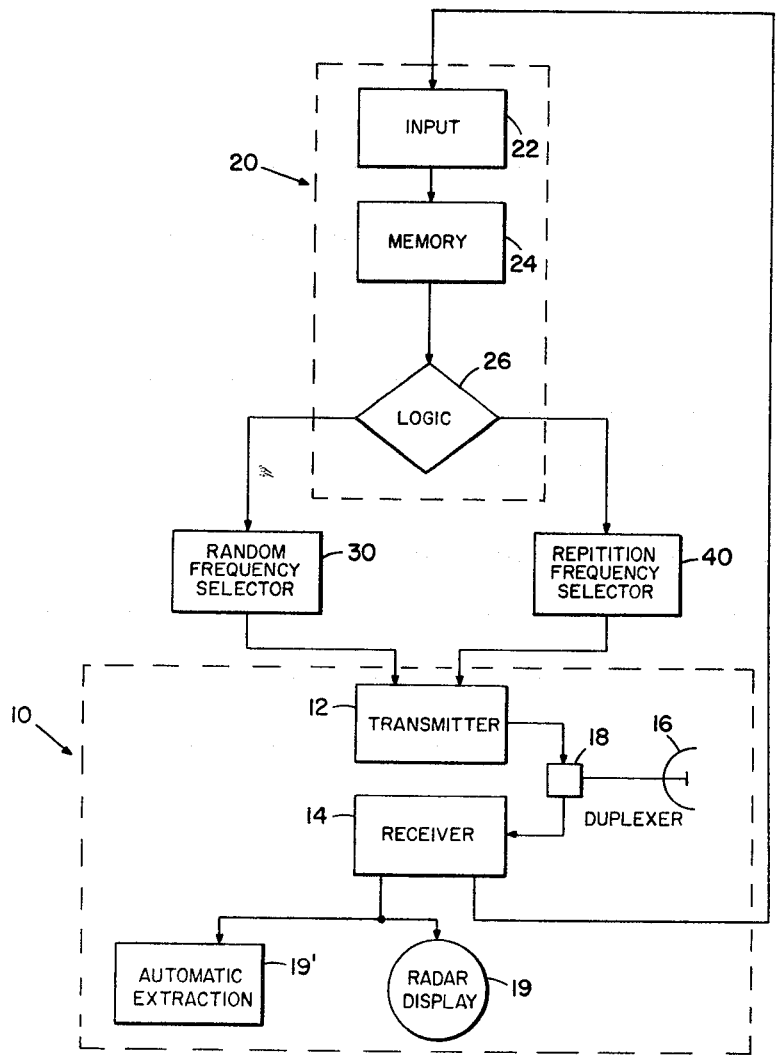
FIGURE 3 shows, in block schematic, a preferred embodiment of a radar system according to the present invention.

Referring now to FIGURE 3, a preferred embodiment of the invention is shown and includes a radar unit 10, a logical control circuit 20 and frequency control circuits 30 and 40.

Radar 10 includes a transmitter 12 and a receiver 14, both connected to antenna 16 through duplexer 18 in a conventional manner. Receiver 14 has the usual output connected to radar display 19 (or to automatic extraction equipment 19') and a second output connected to input circuit 22 of the logical circuit. Input circuit 22 compares the amplitudes of the return signals received during one repetition period and within the range interval considered, with a preselected threshold level V and stores the binary results of this comparison in memory unit 24 for the last two repetition periods. Also stored in memory 24 is the transmission frequency used on the last transmission. Logical unit 26 now checks with memory 24 to determine if the threshold V was exceeded by the received signal in any of the two preceding repetition periods. If not, random frequency selector 30 is activated which selects a new random frequency to be used by transmitter 12 on the next transmission.

If the threshold V was exceeded in any one or both of the two preceding repetition periods, the repetition frequency selector 40 is activated, which then reads the frequency used on the last transmission from memory 24 and commands transmitter 12 to use this frequency on the next transmission. Upon transmission, the frequency used is stored in memory 20 for use by the logical circuit in the following repetition period.

Figure 4:
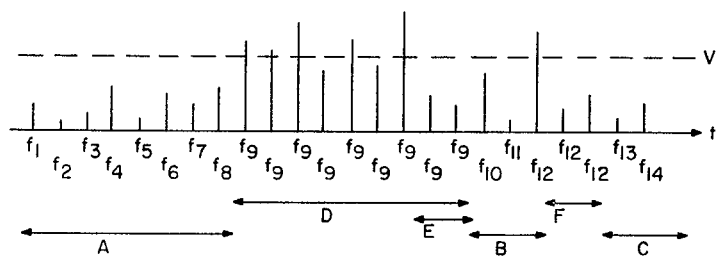
FIGURE 4 shows the signal amplitudes received when a target is present in internal noise and the transmitter is controlled by a logical circuit, according to the present invention.

In the preferred embodiment of the invention shown in FIGURE 3, the control of the transmitter by the logical circuit is done in such a way that, whenever in one repetition period and within a certain range interval, the received signal exceeds a threshold V, the same transmission frequency is used during subsequent transmissions until such a time where the threshold was not exceeded in any of the two preceding repetition periods. This is illustrated graphically in FIGURE 4. The amplitudes shown in this figure may be interpreted as those received in a single range interval or as the largest amplitudes received within a certain range interval. The broken line represents the threshold V.

During the intervals A, B, and C, the transmitter 12 is in the frequency agile mode of operation and transmits in each repetition period on a new randomly selected frequency.

During the interval D, the transmission frequency is constant ($f_9$) after an initial crossing of the threshold V. In the interval E, no threshold crossing occurs during two consecutive repetition periods and the frequency agile mode of operation is resumed.

During the interval F, the transmission frequency is again constant ($f_{12}$), but returns quickly to the frequency agile mode of operation. The large amplitude observed after the first transmission of $f_{12}$ was apparently due to noise.

The curves of FIGURE 5 show the improvements in detection sensitivity that may be expected from the invention. On the vertical axis is shown the probability of detection $P_d$, defined as the probability in percent that a given target will be detected in one scan. On the horizontal axis is shown the signal-to-noise ratio in the receiver due to the target echoes.

All the three curves shown in the figure apply to the same radar, which receives sixteen hits during the illumination period.

The curve $a$ applies to the case, where the radar transmitter operates in the fixed frequency mode and corresponds to the "slow fading" case. The curve $b$ applies in the case, where the radar transmitter operates in the frequency agile mode and corresponds to the "fast fading" case. Curve $c$, finally, shows the performance which may be obtained when a logical circuit, according to the present invention, is used to control the transmitter. The logical circuit assumed is that explained in connection with FIGURE 3 and with the threshold V set to such a level that the probability that receiver noise alone will exceed the threshold is about 1%.

This figure shows that the introduction of a logical circuit, according to the invention, results in a gain in sensitivity of about 3 db as measured between the curves $b$ and $c$ for a probability of detection of $P_d=50\%$.

While this invention has been described with reference to a specific embodiment, it will be apparent that various modifications and changes may be made without departing from the spirit of the invention as defined in the appended claims.

I claim:
1. A radar detection system comprising: a frequency agile radar including a variable frequency transmitter and a receiver; means for comparing the amplitudes of the return signals with a preselected level during a selected time interval; threshold sensing means responsive to said comparing means; a random frequency selector connected between said threshold sensing means and said transmitter; and a repetition frequency selector connected between said threshold sensing means and said transmitter whereby return signals below a preselected level activate said random frequency selector and signals above said level activate said repetition frequency selector.

2. A radar detection system as set forth in claim 1 further including a memory unit connected to said comparing means for storing the results of said comparison for the previous two repetition periods and further storing the frequency of the latest transmission.

References Cited
UNITED STATES PATENTS

| | | | |
|---|---|---|---|
| 2,884,627 | 4/1959 | Ratcliffe | 343—7.5 |
| 3,039,092 | 6/1962 | Rychlik. | |
| 3,044,061 | 7/1962 | Richmond et al. | |

RODNEY D. BENNETT, *Primary Examiner.*

J. P. MORRIS, *Assistant Examiner.*